Patented Oct. 23, 1923.

1,471,876

UNITED STATES PATENT OFFICE.

EDMUND L. ZUKOSKI, OF ST. LOUIS, MISSOURI.

CONCRETE AND PROCESS FOR MAKING SAME.

No Drawing. Application filed March 8, 1922. Serial No. 542,195.

*To all whom it may concern:*

Be it known that I, EDMUND L. ZUKOSKI, a citizen of the United States, residing in the city of St. Louis, in the State of Missouri, have invented a new and useful Improvement in Concrete and Processes for Making Same, of which the following is a full, clear, and exact specification.

My invention relates to concrete and a process for making same and more particularly to concrete which has an aggregate of fibrous or woody material.

Heretofore since sawdust is extremely light and cheap attempts have been made to use it as an aggregate in concrete, but it was found that the water used to wet the cement or other binding material would soak into the fragments of the woody material thereby dissolving certain chemical bodies which acted to prevent the setting of the cement. The objects of my invention are to provide a concrete that will combine lightness, strength, durability and cheapness; to provide a process for manufacturing concrete which will allow sawdust or any other woody or fibrous material to be used as an aggregate; and to provide a treatment which will remove from said aggregate chemical bodies which would prevent proper setting when said aggregate is mixed with a cement and water.

In my improved process for making a concrete I first subject the sawdust or other woody or fibrous material used as an aggregate to the action of a solution of an alkaline silicate, preferably, sodium silicate.

When subjecting the sawdust to this action, it is, preferably, placed in a suitable mixing tub, the solution is applied thereto until the sawdust is covered thereby, and the mass is agitated until the solution has thoroughly saturated the sawdust. Care should be taken so that the solution is not drawn off until it has thoroughly acted to remove all chemical bodies which prevent the binding of a cement when the sawdust is used as an aggregate in concrete. Bubbles will rise to the top of the solution until the chemical action has been completed, and, in some instances, this action will continue for twenty-four hours. During this subjection the solution of sodium silicate removes all the chemical bodies from the sawdust which if dissolved in water when used with cement would prevent proper setting. After this action is completed the liquor derived from the subjection is separated from the sawdust and the residue is washed. The washing is continued until the water used in washing runs virtually clear. The sawdust after it is washed may be dried, but this is not necessary since water is added when the sawdust is combined with the binding material.

While it has been found in practice that a solution in proportions of one part sodium silicate to sixty-four parts water will give the most satisfactory results, I do not propose to limit myself to this exact strength since it is obvious that the proper proportions of water and sodium silicate may be varied within wide limits without deviating from the spirit of my invention.

The sawdust after it has been treated by subjecting it to the action of an alkaline silicate, as outlined above, is then mixed in the ordinary manner with a cementitious binding material and water, in proper proportions. The wet concrete is then poured into either forms or molds, according to the manner in which it is to be used, and is allowed to set. I believe that Portland cement will best serve to bind the aggregate, but gypsum in any form or any cementitious binding material which will set to a proper hardness may be used.

The concrete formed by my novel process will have all the strength and durability of concrete wherein sand and gravel is used as an aggregate; but in addition to having strength and durability it will be light and may be manufactured very cheaply since the aggregate is composed of sawdust, which is generally a waste product and consequently inexpensive.

What I claim as new and desire to secure by Letters Patent, is:

1. A concrete comprising a cementitious binding material, a liquid, and a woody fibrous material which has been previously treated with a solution of sodium silicate and has been washed after the liquor resulting from said treatment has been removed therefrom.

2. A process for making concrete comprising subjecting sawdust to the action of a solution of sodium silicate, separating the liquor resulting from said action from said sawdust, washing the residue, and then mixing said residue with cement.

3. A process for making concrete consisting in subjecting a woody fibrous material to the action of a solution of an alkaline silicate whereby certain bodies are removed from said material, separating the liquor resulting from said action from said material, washing the residue, and then mixing said residue with cement and water and allowing it to set.

In witness whereof I have signed my name to this specification.

EDMUND L. ZUKOSKI.